(12) United States Patent
Amano et al.

(10) Patent No.: US 6,704,636 B2
(45) Date of Patent: Mar. 9, 2004

(54) TIRE PARAMETER ESTIMATION DEVICE AND ROAD SURFACE JUDGMENT DEVICE

(75) Inventors: Yasushi Amano, Aichi-ken (JP); Masanori Miyashita, Aichi-ken (JP); Yoshitoshi Watanabe, Aichi-ken (JP); Akira Tanaka, Anjyo (JP); Yoshiyuki Yasui, Kariya (JP); Mamoru Sawada, Mie-ken (JP)

(73) Assignees: Kabushiki Kaisha Toyota Chuo Kenkyusho, Aichi-gun (JP); Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 42 days.

(21) Appl. No.: 09/824,108

(22) Filed: Apr. 3, 2001

(65) Prior Publication Data
US 2002/0010537 A1 Jan. 24, 2002

(30) Foreign Application Priority Data
Apr. 5, 2000 (JP) .......................................... 2000-103965

(51) Int. Cl.$^7$ ............................................... G06F 17/00
(52) U.S. Cl. ............................... 701/80; 73/105; 73/146
(58) Field of Search ....................... 701/70, 80; 73/104, 73/105, 146

(56) References Cited

U.S. PATENT DOCUMENTS

| | | | | | |
|---|---|---|---|---|---|
| 4,834,205 A | * | 5/1989 | Mizuno et al. | ............... | 180/422 |
| 5,033,002 A | * | 7/1991 | Sol | ............... | 701/90 |
| 5,216,608 A | * | 6/1993 | Ito et al. | ............... | 701/90 |
| 5,411,325 A | * | 5/1995 | Tanaka et al. | ............... | 303/150 |
| 6,418,369 B2 | * | 7/2002 | Matsumoto et al. | ............... | 701/80 |
| 6,429,788 B2 | * | 8/2002 | Matsumoto et al. | ............... | 340/901 |
| 2001/0029419 A1 | * | 10/2001 | Matsumoto et al. | ............... | 701/80 |
| 2002/0162389 A1 | * | 11/2002 | Yokota et al. | ............... | 73/146 |
| 2003/0051544 A1 | * | 3/2003 | Hong | ............... | 73/146 |

FOREIGN PATENT DOCUMENTS

| | | |
|---|---|---|
| DE | 198 23 646 A1 | 12/1999 |
| JP | 5-332762 | 12/1993 |
| JP | 9-058514 | 3/1997 |
| JP | 9-188238 | 7/1997 |
| JP | 11-504585 | 4/1999 |
| JP | 11-153518 | 6/1999 |

* cited by examiner

Primary Examiner—Gary Chin
(74) Attorney, Agent, or Firm—Oblon, Spivak, McClelland, Maier & Neustadt, P.C.

(57) ABSTRACT

A tire parameter estimation device that is economical and can accurately estimate tire parameters while taking into consideration both states of a vehicle and states of a road environment. A μ gradient detecting circuit detects a μ gradient on the basis of a wheel speed detected by a wheel speed detecting circuit. A gradient value comparing circuit determines a μ gradient section value μr, which is a mean value of the μ gradients from the μ gradient detecting circuit, and calculates a rate (=μr/μI) of the μ gradient mean value μr with respect to a μ gradient initial value μI. A tire temperature estimating circuit stores a table representing the relation between the rate and a tire temperature, and estimates a tire temperature corresponding to the rate calculated by the gradient value comparing circuit as the present tire temperature.

8 Claims, 8 Drawing Sheets

TIRE PARAMETER ESTIMATION DEVICE AND ROAD SURFACE JUDGMENT DEVICE

BACKGROUND OF THE INVENTION

1. Field of the Invention

The present invention relates to a tire parameter estimation device and a road surface judgment device. More particularly, the present invention relates to a tire parameter estimation device and a road surface judgment device suitable for controlling the running of a vehicle.

2. Description of Related Art

It has been known to estimate tire parameters of tires of a vehicle and to control the running of the vehicle by using the tire parameters. The tire parameters include tire wear amount and tire temperature, for example.

Japanese Patent Application Laid-Open (JP-A) No. 5-332762, for example, discloses a tire abnormal wear detector to estimate the tire wear amount. This tire abnormal wear detector detects abnormal wear of the tire on the basis of the change in the number of revolutions of the tire when a dynamic radius of the tire becomes small due to the wear of the tire. More specifically, the correlation between a resonance frequency (dependent on air pressure) determined on the basis of output of a wheel speed sensor and the number of revolutions of the tire is obtained in advance while taking the change in the dynamic radius due to the air pressure of the time into account, the detector judges that the tire is worn out when the number of revolutions of the tire falling outside this correlation is detected.

However, there has been a problem that this tire abnormal wear detector is only able to detect the tire wear when the dynamic radius becomes uniformly small as the tire is uniformly worn out. Grip force of the tire drops due to the wear of a tire shoulder, for example, but this detector cannot detect such a wear.

Also, to estimate the tire temperature, Japanese National Publication No. 11-504585, for example, discloses a device in which a temperature sensor is provided with a tire housing to transmit a temperature measurement value obtained by this temperature sensor into, or outside, a vehicle compartment. However, this device requires exclusive components such as a slip ring and the temperature sensor to measure the tire temperature, which results in an increase in costs, and there have been problem with durability and reliability.

In addition, tire parameters, which are effected by external environment, such as road surface friction, are effected, by both characteristics of the vehicle and characteristics of the road environment. Moreover, because it is difficult to strictly distinguish between vehicular factors and environmental factors, it is very difficult to estimate the tire parameters by only the behavior of the vehicle and the road state.

It is generally difficult to judge road surface state unless the state of the tire is somehow made close to a critical region (maximum friction region). If such a control is made, however, a change in the behavior of the vehicle occurs, whereby vibration and noise arise, and driving ease and maneuverability deteriorate.

Road surface state can also be grasped by directly measuring the road by sensor disposed on the road, but sensors cannot be installed on an entire road from the aspect of cost. Sensors may be installed partially on the road, but there is no point in installing sensors partially because wear characteristics vary greatly depending on place of the road.

SUMMARY OF THE INVENTION

The present invention is devised in order to eliminate the problems described above. It is an object of the present invention to provide a tire parameter estimation device that is economical and can accurately estimate tire parameters while taking into consideration both vehicular states road and environment states. It is another object of the present invention to provide a road surface judgment device that can easily judge road surface states without having to expend cost on facilities for the road.

According to a first aspect of the present invention, there is provided a tire parameter estimation device, the device comprising: a wheel speed detecting section for detecting a wheel speed; a road surface friction parameter generating section for generating a road surface friction parameter representing a friction state between a tire of a wheel and a road surface on the basis of the wheel speed detected by the wheel speed detecting section; a memory section for storing the road surface friction parameter generated by the road surface friction parameter generating section; and a tire parameter estimation section for estimating at least one tire parameter relating to the tire and the road surface on the basis of the road surface friction parameter stored by the memory section and the road surface friction parameter newly generated by the road surface friction parameter generating section.

According to the first aspect of the invention, the road surface friction parameter generating section generates the road surface friction parameter on the basis of the wheel speed. Here, the road surface friction parameter and the road surface have the correlation, and the road surface friction parameter at the time when the vehicle is running on a reference road surface serves as a reference value. The tire parameter that represents the relation between the road surface and the tire depends on the change of the road surface friction parameter. The road surface friction parameter as the reference value is stored. The tire parameter can thus be estimated on the basis of this road surface friction parameter and the road surface friction parameter that is newly estimated.

According to a second aspect of the present invention, the tire parameter estimation device of the first aspect of the present invention further comprises a reference running state detecting section for detecting a reference running state of a vehicle, wherein the memory section stores the road surface friction parameter at a time at which the reference running state detecting section detects the reference running state, as a reference parameter, and the tire parameter estimating section estimates, as the tire parameter, a tire temperature corresponding to the road surface friction parameter newly generated by the road surface friction parameter generating section by using the characteristics of the tire temperature and the road surface friction parameter with respect to the reference parameter.

According to the second aspect of the present invention described above, the road surface friction parameter at the time when the vehicle is under the reference running state is stored as the reference parameter. When the tire temperature changes, the road friction parameter also changes. The tire parameter estimating section utilizes such a characteristics and estimates the tire temperature on the basis of the road surface friction parameter newly estimated during the vehicle running.

According to a third aspect of the present invention, the tire parameter estimation device of the first aspect of the present invention described above further comprises a reference running state detecting section for detecting a reference running state of a vehicle; a running start detecting section for detecting a start of running of the vehicle on the basis of the wheel speed detected by the wheel speed detecting section; and a writing section for writing into the memory section the road surface friction parameter generated by the road surface friction parameter generating section each time the running start detecting section detects the start of running of the vehicle and the reference running state detecting section detects the reference running state of the vehicle, wherein the tire parameter estimating section estimates a wear amount of the tire as the tire parameter on the basis of a change in a plurality of the road surface friction parameters stored in the memory section.

According to the third aspect of the present invention, the road surface friction parameter generated by the road surface friction parameter generating section is written into the memory section each time the running start judgment section detects the start of running of the vehicle and the reference running state detecting section detects the reference running state of the vehicle. Here, the tire wear amount changes in accordance that the road surface friction parameter changes. The tire parameter estimating section utilizes this characteristic and estimates the tire wear amount on the basis of the drop amount of the road surface friction parameter stored in the memory section.

According to a fourth aspect of the present invention, there is provided a road surface judgment device, the device comprising: a vehicle state detecting section for detecting a running state of a vehicle; a road surface friction state estimating section for estimating a road surface friction state of a road surface on which the vehicle is running, on the basis of the running state of the vehicle detected by the vehicle state detecting section; a road surface state measuring section for measuring a road surface state of the road surface on which the vehicle is running, on the basis of the running state of the vehicle detected by the vehicle state detecting section and a controlled state of the vehicle; a referencing section for corresponding the road surface friction state with the road surface state to obtain a reference value; a reference value changing section for changing the road surface friction state of the reference value to the road surface friction state estimated by the road surface friction state estimating section when the road surface state newly measured by the road surface state measuring section is the same as the road surface state of the reference value; and a road surface state judging section for judging the road surface state of the road surface on which the vehicle is currently running, on the basis of the road surface friction state newly estimated by the road surface state estimating section and the reference value processed through the reference value changing section.

According to the fourth aspect of the present invention, the road friction estimating section estimates the road surface friction state of the road surface on which the vehicle is running, on the basis of the running state of the vehicle detected by the vehicle state detecting section. The road surface state of the road surface on which the vehicle is running is measured, on the basis of the running state of the vehicle detected by the vehicle state detecting section and the control state of the vehicle. The road surface friction state and the road surface state thus obtained are associated with each other to give a reference value. Incidentally, when the vehicle again runs on the same road surface as the reference road surface, the road surface friction state of the reference value is changed to the road surface friction state estimated by the road surface friction state estimating section. In this way, the reference value is changed in such a manner as to correspond to the vehicle state and the road surface state. The road surface state judging section thus judges the road surface state of the road surface, on which the vehicle is currently running, on the basis of the road surface friction state newly estimated by the road surface state estimating section and the reference value processed through the reference value changing section.

According to a fifth aspect of the present invention, in the road surface judgment device of the fourth aspect of the present invention, the referencing section corresponds the road surface friction state at a time at which the vehicle is in a predetermined running state, with the road surface state.

According to a sixth aspect of the present invention, in the road surface judgment device of the fourth or fifth aspect of the present invention, the referencing section corresponds the road surface friction state, at a time at which the vehicle is running on a predetermined road surface, with the road surface state.

According to a seventh aspect of the present invention, there is provided a road surface judgment device, the device comprising: a vehicle state detecting section for detecting a vehicle running state; a receiving section for receiving road surface environment information relating to a reference road surface; a road surface state estimating section for estimating a road surface state of a road surface on which a vehicle is running, on the basis of the vehicle running state detected by the vehicle state detecting section; a memory section for storing, as a reference value with respect to the reference road surface, the road surface state estimated by the road surface state estimating section each time the receiving section receives the road surface environment information; and a judgment section for judging a state of a road surface other than the reference road surface, on the basis of the road surface state estimated by the road surface state estimating section and the reference value with respect to the reference road surface stored in the memory section, when the receiving section does not receive the road surface environment information.

According to the seventh aspect of the present invention, the road surface state estimating section estimates the road surface state of the road surface on which the vehicle is running, on the basis of the vehicle running state detected by the vehicle state detecting section. Each time the receiving section receives the road surface environment information, the memory section stores the road surface state estimated by the road surface state estimating section as the reference value with respect to the reference road surface. In other words, the memory section stores the road surface state at the time at which the vehicle is running on the reference road surface as the reference value. Consequently, the reference value for the reference road surface is updated to an optimal value in accordance with the change of the road environment. The road surface judgment device judges the state of road surface other than the reference road surface on the basis of the road surface state estimated by the road surface state estimating section and the reference value for the reference road surface stored in the memory section.

According to a eighth aspect of the present invention, in the road surface judgment device of the seventh aspect of the present invention, the memory section stores the road surface state estimated by the road surface state estimating section at a time at which the vehicle is in a predetermined running state, as the reference value with respect to the reference road surface.

According to a ninth aspect of the present invention, in the tire parameter estimation device of the second aspect of the present invention, the reference running state detecting section detects whether or not the reference running state of the vehicle, on the basis of: the road surface friction parameter; and whether or not the vehicle is in a predetermined state.

According to a tenth aspect of the present invention, in the tire parameter estimation device of the ninth aspect of the present invention, the predetermined state of the vehicle is at least one of that: the vehicle is running substantially straight; the vehicle is running in a substantially constant speed; a rotation vibration of the wheel is less than or equal to a predetermined level; a wiper of the vehicle is not operating; and a temperature outside the vehicle is more than or equal to a predetermined temperature.

According to an eleventh aspect of the present invention, in the tire parameter estimation device of the first aspect of the present invention, the device further comprises: a reference running state detecting section for detecting a reference running state of the vehicle; a running start detecting section for detecting a start of running of the vehicle on the basis of the wheel speed detected by the wheel speed detecting section; a time judging section for judging a time; and a writing section for writing into the memory section the road surface friction parameter generated by the road surface friction parameter generating section each time the running start detecting section detects the start of running of the vehicle, the reference running state detecting section detects the reference running state of the vehicle, and the time judging section judges a predetermined timing; wherein the tire parameter estimating section estimates a wear amount of the tire as the tire parameter on the basis of a change in a plurality of the road surface friction parameters stored in the memory section.

According to a twelfth aspect of the present invention, in the tire parameter estimation device of the first aspect of the present invention, the device further comprises: a reference running state detecting section for detecting a reference running state of the vehicle; a running start detecting section for detecting a start of running of the vehicle on the basis of the wheel speed detected by the wheel speed detecting section; and a writing section which can write into the memory section the road surface friction parameter generated by the road surface friction parameter generating section when the running start detecting section detects the start of running of the vehicle and the reference running state detecting section detects the reference running state of the vehicle; wherein the tire parameter estimating section estimates a wear amount of the tire as the tire parameter on the basis of a change in a plurality of the road surface friction parameters stored in the memory section.

According to a thirteenth aspect of the present invention, in the road surface judgment device of the fourth aspect of the present invention, the device further comprises a memory section for storing the reference value and the reference value changed by the reference value changing section.

According to a fourteenth aspect of the present invention, the road surface judgment device comprises: a vehicle state detecting section for detecting a running state of a vehicle; a road surface friction state estimating section for estimating a road surface friction state of a road surface on which the vehicle is running, on the basis of the running state of the vehicle detected by the vehicle state detecting section; a road surface state measuring section for measuring a road surface state of the road surface on which the vehicle is running, on the basis of the running state of the vehicle detected by the vehicle state detecting section; a referencing section for corresponding the road surface friction state with the road surface state to obtain a reference value; a reference value changing section for changing the road surface friction state of the reference value to the road surface friction state estimated by the road surface friction state estimating section when the road surface state newly measured by the road surface state measuring section is the same as the road surface state of the reference value; and a road surface state judging section for judging the road surface state of the road surface on which the vehicle is currently running, on the basis of the road surface friction state newly estimated by the road surface friction state estimating section and the reference value processed through the reference value changing section.

DESCRIPTION OF THE PREFERRED EMBODIMENTS

Embodiments of the present invention will hereinafter be described in detail with reference to drawings. The present invention is used appropriately to control the running of a vehicle, which includes such as VSC (Vehicle Stability Control), ABS (Automatic Braking System), TRC (TRaction Control system), AT (Automatic Transmission), ACC (Adaptive Cruise Control), ITS (Intelligent Transport System), and so forth.

[First Embodiment]

Figure 1:
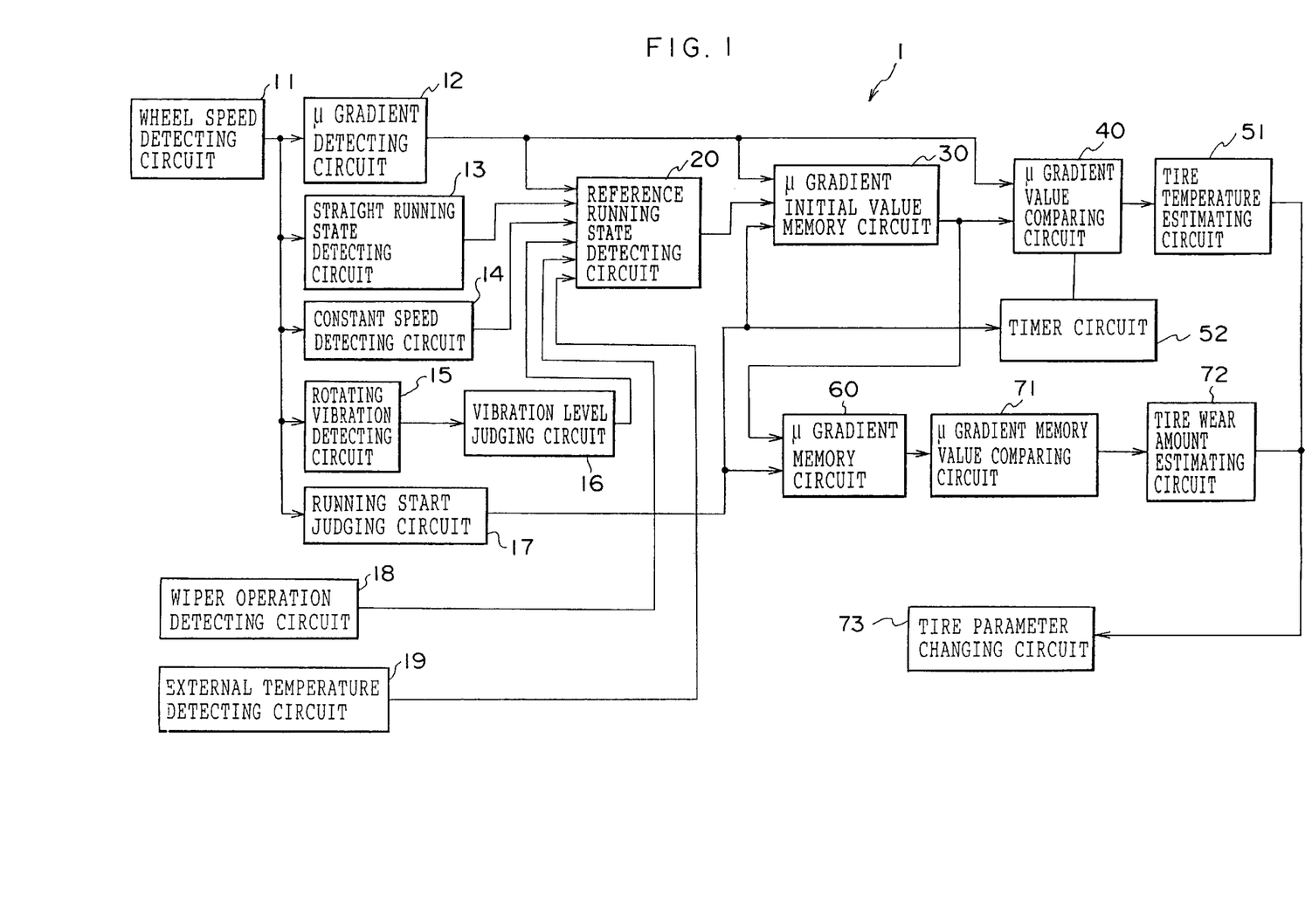
FIG. 1 is a block diagram showing a structure of a tire parameter estimation device according to a first embodiment of the present invention.

FIG. 1 is a block diagram showing a structure of a tire parameter estimation device 1 according to a first embodiment of the present invention. The tire parameter estimation device 1 estimates tire parameters used to control the running of a vehicle.

The tire parameter estimation device 1 includes a wheel speed detecting circuit 11 for detecting wheel speed, a $\mu$ gradient detecting circuit 12 for detecting a $\mu$ gradient of a road surface (hereinafter called "$\mu$ gradient"), a straight running state detecting circuit 13 for detecting a state in which a vehicle runs straight, a constant speed detecting circuit 14 for detecting a state in which the vehicle runs at a constant speed, a rotational vibration detecting circuit 15 for detecting vibration of a wheel and a vibration level judging circuit 16 for judging, from the vibration level, whether or not the vehicle is running on a flat road.

The wheel speed detecting circuit 11 is provided on each tire of the vehicle, detects the wheel speed of the tire, and supplies (outputs) the detection result thereof to the $\mu$ gradient detecting circuit 12, the straight running state detecting circuit 13, the constant speed detecting circuit 14, the rotational vibration detecting circuit 15 and a running start judgment circuit 17.

The $\mu$ gradient detecting circuit 12 detects the $\mu$ gradient on the basis of the wheel speed detected by the wheel speed detecting circuit 11, and supplies this $\mu$ gradient to a reference running state detecting circuit 20, a $\mu$ gradient initial value memory circuit 30, and a p gradient value comparing circuit 40.

The straight running state detecting circuit 13 determines the difference in wheel speeds of right and left wheels on the basis of the wheel speed from the wheel speed detecting circuit 11. When the difference is less than a predetermined value, the straight running state detecting circuit 13 judges that the vehicle is running straight, and outputs a logic H (1). When the difference is more than or equal to the predetermined value, the straight running state detecting circuit 13 judges that the vehicle is running along a curve, and outputs a logic L (0).

The constant speed detecting circuit 14 differentiates the wheel speed of each wheel from the wheel speed detecting circuit 11. When the differentiation value is less than or equal to a predetermined threshold value, the constant speed detecting circuit 14 judges that the vehicle is running at a constant speed, and outputs the logic H. When the differentiation value is more than the predetermined threshold value, the constant speed detecting circuit 14 judges that the vehicle is not running at a constant speed, and outputs the logic L.

The rotational vibration detecting circuit 15 detects the rotational frequency of the wheel speed and supplies the detection result to the vibration level judging circuit 16. The vibration level judging circuit 16 judges whether or not the rotational frequency exceeds a predetermined threshold value. When the rotational frequency is less than or equal to the threshold value, the rotational vibration detecting circuit 15 judges that the road is a flat road, and outputs the logic H. When the rotational frequency is more than the threshold value, it judges that the road is a rough road, and outputs the logic L.

The tire parameter estimation device 1 further includes the running start judging circuit 17 for judging whether or not the vehicle has started running, a wiper operation detecting circuit 18 for detecting whether or not the wiper is operating, and an external temperature detecting circuit 19 for detecting an external temperature.

The running start judging circuit 17 judges on the basis of the wheel speed from the wheel speed detecting circuit 11 whether or not the vehicle starts running. When it judges that the vehicle has started running, the running start judging circuit 17 outputs the logic H. When it judges that the vehicle has not started running, the running start judging circuit 17 outputs the logic L. The wiper operation detecting circuit 18 detects whether or not a wiper (not shown in the drawing) provided on the vehicle is operating. When it judges that the wiper is operating, the wiper operation detecting circuit 18 outputs the logic H. When it judges that the wiper is not operating, the wiper operation detecting unit 18 outputs the logic L. The external temperature detecting circuit 19 detects the external temperature of the vehicle and outputs the logic H when the external temperature is higher than a predetermined temperature, and outputs the logic L when the external temperature is not higher than the predetermined temperature.

The tire parameter estimation device 1 further includes the reference running state detecting circuit 20 for detecting running states that becomes a reference for the vehicle on the basis of the detection output of each of the circuits described above, and the $\mu$ gradient initial value memory circuit 30 for storing an initial value of the $\mu$ gradient.

Figure 2:
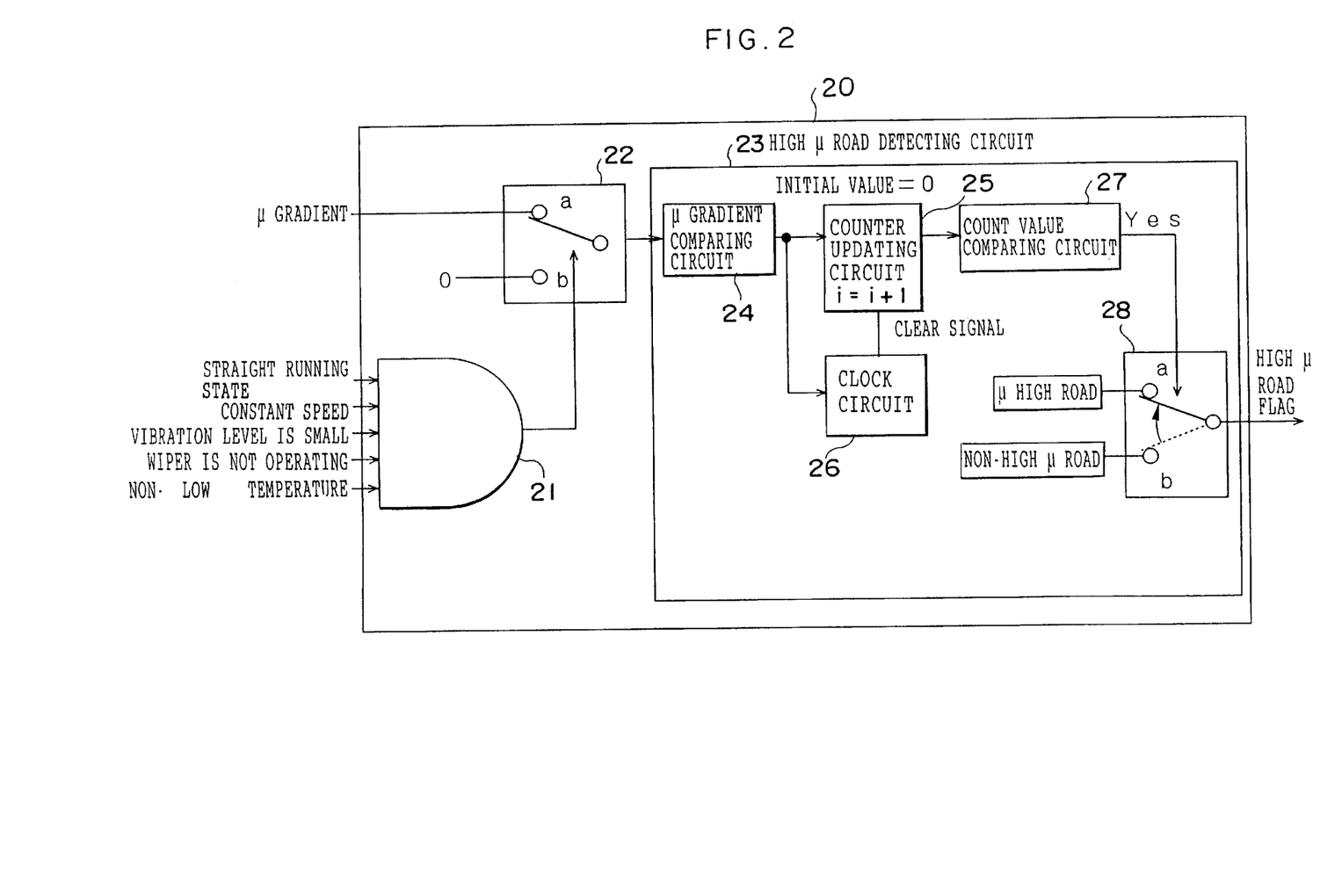
FIG. 2 is a block diagram showing a specific structure of a reference running state detection circuit of the tire parameter estimation device.

As shown in FIG. 2, the reference running state detecting circuit 20 includes an AND gate 21 for outputting a logical multiply of the detection output of each circuit, a switch circuit 22 for switching and outputting the $\mu$ gradient and the signal "0" and a high $\mu$ road detecting circuit 23 for detecting whether or not the vehicle is running on a high $\mu$ road.

The AND gate 21 calculates the logical multiply of the output of each of the straight running state detecting circuit 13, the constant speed detecting circuit 14, the vibration level judging circuit 16, the wiper operation detecting circuit 18 and the external temperature detecting circuit 19, and supplies the calculation result to the switch circuit 22.

The switch circuit 22 is switched to a terminal a when a signal of the logic H is supplied from the AND gate 21 and to a terminal b when a signal of the logic L is supplied. The switch circuit 22 supplies to the high $\mu$ road detection circuit the $\mu$ gradient when switched to the terminal a and the signal "0" when switched to the terminal b.

The high $\mu$ road detecting circuit 23 includes a $\mu$ gradient comparing circuit 24 for comparing the $\mu$ gradient with a threshold value α, a counter updating circuit 25 for updating a count value on the basis of the $\mu$ gradient, a clock circuit 26 for outputting a clear signal for clearing the count value, a count value comparing circuit 27 for comparing the count value with a predetermined value and a flag switch circuit 28 for outputting a high $\mu$ road flag or a non-high $\mu$ road flag.

Figure 3:
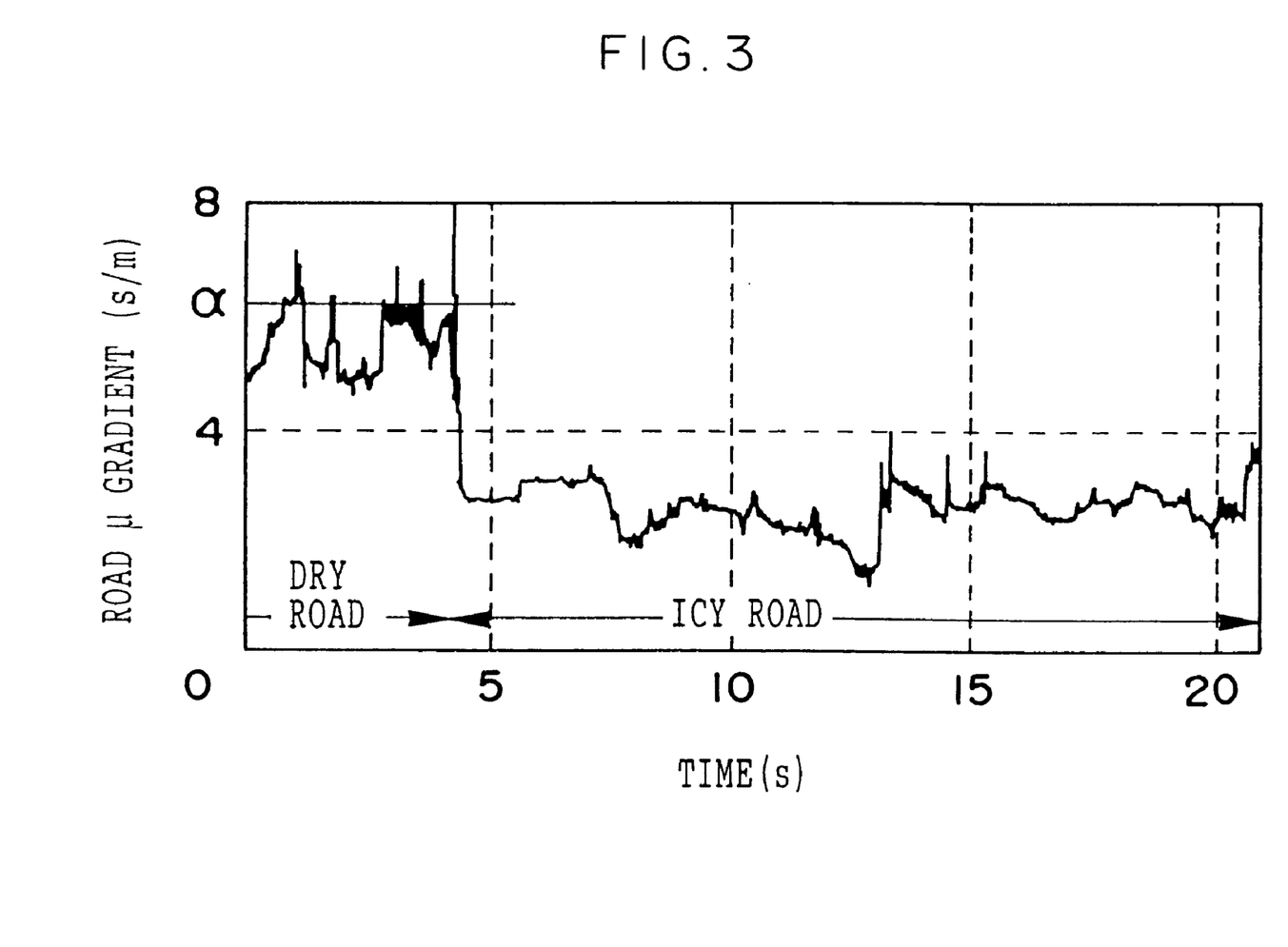
FIG. 3 is a diagram showing a relation between a $\mu$ gradient and a road surface states when a vehicle is running.

The $\mu$ gradient comparing circuit 24 judges whether or not the $\mu$ gradient supplied from the switch circuit 22 is greater than the threshold value α, and supplies, to the counter updating circuit 25 and the clock circuit 26, the logic H when the $\mu$ gradient is greater than the threshold value α and the logic L when the $\mu$ gradient is no greater than the threshold value Δ. Here, the vehicle is running on a dry road when the $\mu$ gradient is high and on an icy road when the $\mu$ shown in FIG. 3. The threshold value α is set to a value close to the $\mu$gradient maximum value during running on the high $\mu$ road.

The counter updating circuit 25 sets a count value with i=0 as an initial value. The counter updating circuit 25 increments and updates the count value i at predetermined intervals of time only when the signal supplied from the $\mu$ gradient comparing circuit 24 is the logic H, and supplies the count result to the count value comparing circuit 27. The counter updating circuit 25 does not update the count value i when the signal of the logic L is supplied.

The clock circuit 26 monitors the signal from the $\mu$ gradient comparing circuit 24 and starts counting the clocks when this signal changes from the logic H to the logic L. When the signal from the $\mu$ gradient comparing circuit 24 remains at the logic L even after a predetermined number of clocks are counted (even after a predetermined amount of time has elapsed), the clock circuit 26 supplies the clear signal to the counter updating circuit 25. Receiving the clear signal, the counter updating circuit 25 clears the count value i, sets it again to 0, and starts again counting. Incidentally, the reason why the clock circuit 26 outputs the clear signal after a predetermined amount of time has elapsed is to exclude a case in which it is detected that the vehicle is running only momentarily on a non-high $\mu$ road.

The count value comparing circuit 27 compares the count value i of the counter updating circuit 25 with a predetermined value N, outputs the logic H when i>N and supplies it to the flag switch circuit 28. Incidentally, the count value comparing circuit 27 outputs the logic L at times other than when the count value is i>N.

The flag switch circuit 28 is switched to a terminal a when the signal supplied from the count value comparison circuit 27 is the logic H, and is structured to a terminal b when the signal has the logic L. The count value comparing circuit 27 outputs the high $\mu$ road flag (logic H) representing running on the high $\mu$ road when the flag switch circuit 28 is switched to the terminal a and the non-high $\mu$ road flag (logic L) representing running on the non-high $\mu$ road when the flag switch circuit 28 is switched to the terminal b.

Figure 4:
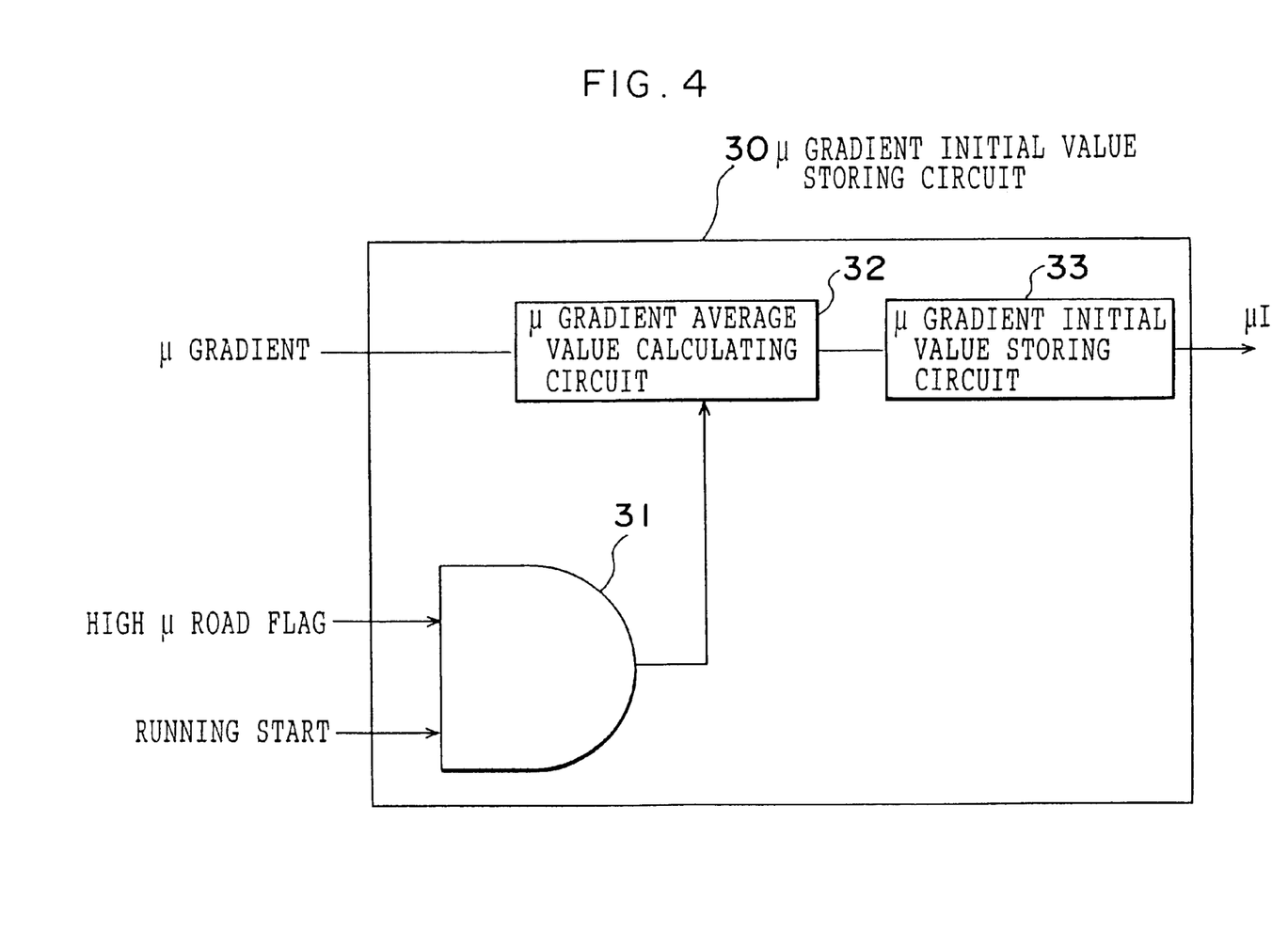
FIG. 4 is a block diagram showing a specific structure of a $\mu$ gradient initial value memory circuit of the tire parameter estimation device.

As shown in FIG. 4, the $\mu$ gradient initial value memory circuit 30 includes an AND gate 31, a $\mu$ gradient mean value calculating circuit 32 for calculating a mean value of the $\mu$ gradients and a $\mu$ gradient initial value memory circuit 33 for storing the initial value of the $\mu$ gradient.

The AND gate 31 calculates the logical multiply of the flag from the reference running state detecting circuit 20 and the signal from the running start judging circuit 17, and supplies the calculation result to the $\mu$ gradient mean value calculating circuit 32.

The $\mu$ gradient mean value calculating circuit 32 calculates the mean value on the basis of the $\mu$ gradients from the $\mu$ gradient detecting circuit 12. The $\mu$ gradient mean value calculating circuit 32 calculates the mean value of the $\mu$ gradients only when the signal of the logic H is supplied thereto from the AND gate 31. Therefore, the $\mu$ gradient mean value calculating circuit 32 calculates the mean value of the $\mu$ gradients only when the vehicle is actually running on the high $\mu$ road. The $\mu$ gradient initial value memory circuit 33 stores first the $\mu$ gradient mean value (hereinafter called "$\mu$gradient initial value $\mu$I") calculated by the $\mu$ gradient mean value calculating circuit 32. Incidentally, this $\mu$ gradient initial value $\mu$I is stored as such without being updated till the judgement of next running start.

The tire parameter estimation device 1 further includes the $\mu$ gradient value comparing circuit 40 for comparing the $\mu$ gradient initial value $\mu$I with the present $\mu$ gradient, a tire temperature estimating circuit 51 for estimating the tire temperature on the basis of the comparison result of the $\mu$ gradient value comparing circuit 40, and a timer circuit 52 for outputting a timer signal.

Figure 5:
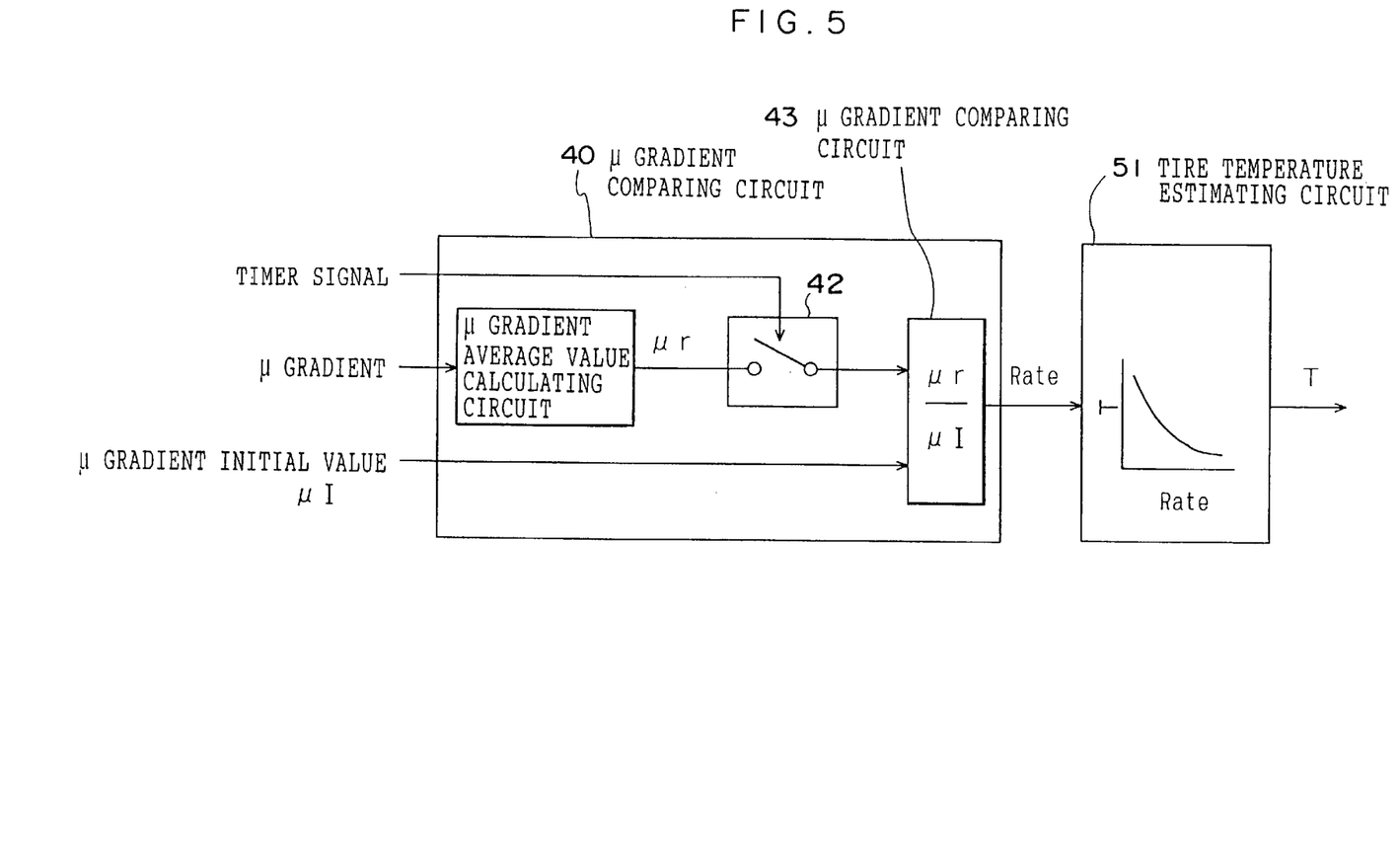
FIG. 5 is a block diagram showing a specific structure of a gradient value comparison circuit of the tire parameter estimation device.

Here, the $\mu$ gradient value comparing circuit 40 includes a $\mu$ gradient mean value calculating circuit 41 for calculating the mean value of the $\mu$ gradients, a switch circuit 42 and a $\mu$ gradient comparing circuit 43 as shown in FIG. 5. The $\mu$ gradient mean value calculating circuit 41 calculates the mean value ($\mu$ gradient mean value $\mu$r) on the basis of the $\mu$ gradients supplied from the $\mu$ gradient detecting circuit 12, and supplies the $\mu$ gradient mean value $\mu$r to the switch circuit 42. This averaging process may use moving average or the like.

The switch circuit 42 is turned ON when the timer signal is supplied and OFF when the timer signal is not supplied. Incidentally, the timer circuit 52 starts operating when the logic H is supplied from the running start judging circuit 17 and outputs the timer signal at predetermined intervals. When turned ON, the switch circuit 42 supplies the $\mu$ gradient mean value $\mu$r calculated by the $\mu$ gradient mean value calculating circuit 41 to the $\mu$ gradient comparing circuit 43. The $\mu$ gradient comparing circuit 43 calculates a Rate (=$\mu$r/$\mu$I) of the $\mu$ gradient means value $\mu$r to the gradient initial value $\mu$I supplied from the $\mu$ gradient initial value memory circuit 43.

The tire temperature estimating circuit 51 stores a table representing the relation between the Rate and the tire temperature T as shown in FIG. 5. When the tire temperature T rises, the tread rubber becomes soft, and the $\mu$ gradient drops due to a drop in the shearing force. Here, the $\mu$ gradient ($\mu$ gradient with respect to the slip ratio) has the following relation:

$$(\mu \text{ gradient}) = (\tfrac{1}{2}) \cdot k \cdot w \cdot L^2$$

k: tread elastic modulus
w: tread width
L: length of ground contact

The tread elastic modulus k varies with rise in the tire temperature T. Therefore, the $\mu$ gradient drops with rise in the tire temperature. The tire temperature estimating circuit 51 stores such characteristics as a table. The tire temperature T corresponding to the Rate calculated by the $\mu$ gradient comparison circuit 43 is determined, and the tire temperature T is outputted.

The tire parameter estimation device 1 further includes a $\mu$ gradient memory circuit 60 for storing the $\mu$ gradient initial value $\mu$I, a $\mu$ gradient memory value comparing circuit 71 for storing daily $\mu$ gradient, a tire wear amount estimating circuit 72 for estimating the tire wear amount, and a tire parameter changing circuit 73 for changing the tire parameters.

Figure 6:
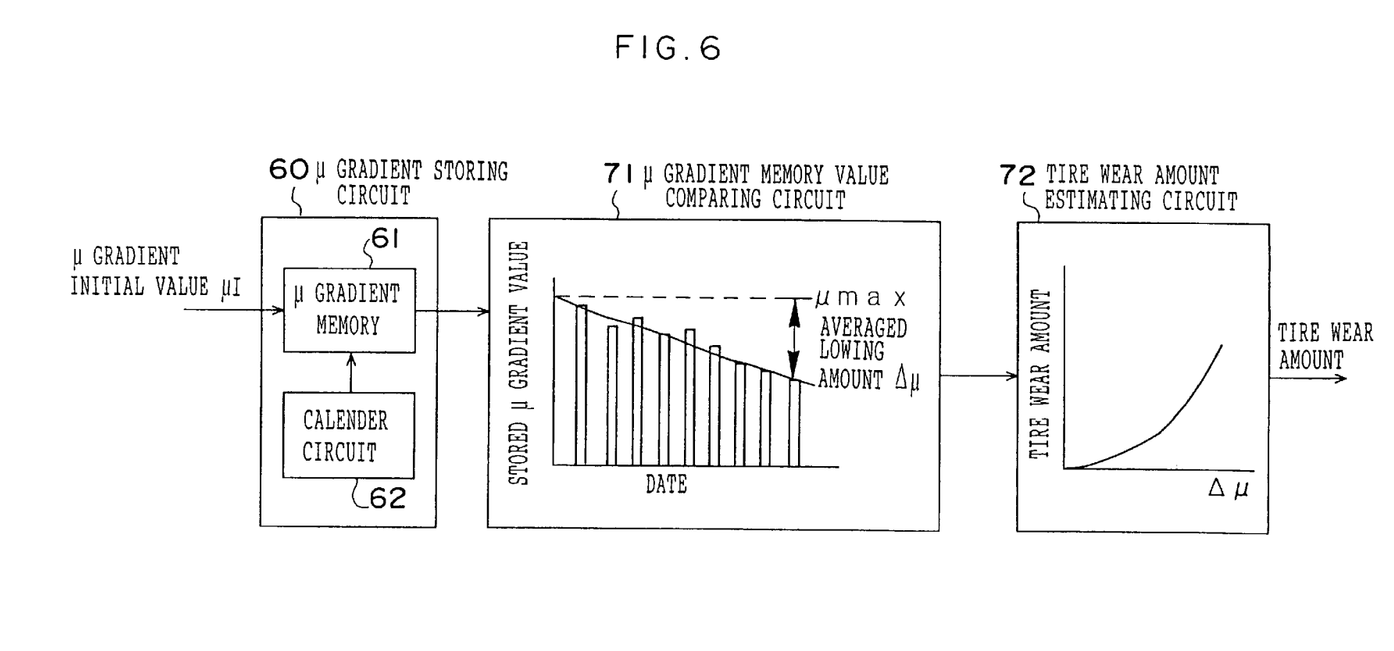
FIG. 6 is a diagram for describing a $\mu$ gradient memory circuit, a $\mu$ gradient memory value comparison circuit and a tire wear amount estimation circuit of the tire parameter estimation device.

As specifically shown in FIG. 6, the $\mu$ gradient memory circuit 60 includes a $\mu$ gradient memory 61 for storing the $\mu$ gradient initial value $\mu$I and a calendar circuit 62 for judging the date. The gradient memory 61 stores the $\mu$ gradient initial value $\mu$I supplied from the $\mu$ gradient initial value memory circuit 30. Incidentally, the $\mu$ gradient memory 61 stores once a day the $\mu$ gradient initial value $\mu$I in accordance with the date judged by the calendar circuit 62.

On the basis of the daily $\mu$ gradient initial value $\mu$I stored in the $\mu$ gradient memory 61, the $\mu$ gradient memory value comparing circuit 71 calculates a mean $\mu$ gradient reduction amount $\Delta\mu$ resulting from deterioration of the tire through time. Here, as shown in FIG. 6, an approximate curve of the daily $\mu$ gradient initial value $\mu$I is determined by using the date for the horizontal axis (x axis) and using the $\mu$ gradient initial value $\mu$I for the vertical axis (y axis). The $\mu$ gradient reduction amount $\Delta\mu$ is determined by the difference between $\mu$max and a point on the approximate curve in FIG. 6. The reason why such an approximate curve is determined in this manner is because the $\mu$ gradient changes every day due to mounted load and the like, and the tire wear amount cannot be estimated correctly by using only the data of a certain day.

The tire wear amount estimating circuit 72 stores a table representing the relation between the gradient reduction amount $\Delta\mu$ and the tire wear amount. The tire wear amount estimating circuit 72 refers this table to determine the tire wear amount corresponding to the gradient reduction amount $\Delta\mu$ determined by the $\mu$ gradient memory value comparing circuit 71.

Incidentally, the tire wear brings about changes in the $\mu$ gradient through time over a long period. In contrast, a rise in the tire temperature T brings about changes in the $\mu$ gradient within a short period. Therefore, the $\mu$ gradient is compared every day under the state where temperature of the tire is not raised immediately after the start of running of the vehicle to estimate the tire wear amount.

The tire parameter changing circuit 73 changes the tire parameters on the basis of the tire temperature estimated by the tire temperature estimating circuit 51 and the tire wear amount estimated by the tire wear amount estimating circuit 72. The tire parameters thus changed are used for controlling the running of the vehicle, which includes VSC, ABS, TRC, and so forth.

As described above, the tire parameter estimation device 1 can estimate the tire temperature and the tire wear and can change the tire parameters of the vehicle by with a relatively simple structure. If further structured so that a warning is given when the tire wear amount exceeds a predetermined value, an accident resulting from the tire wear can be prevented in advance. Moreover, the $\mu$ gradient memory 61 stores the $\mu$ gradient initial value $\mu$I at any timings.

Though this embodiment uses the tire temperature and the tire wear amount as the tire parameters, the present invention is not limited particularly to such tire parameters. For example, the present invention can be applied similarly to, for example, detecting the fitting of studless tires (to detect a drop in the tread elastic modulus),as parameters relating to the road surface and the tire.

[Second Embodiment]

Figure 7:
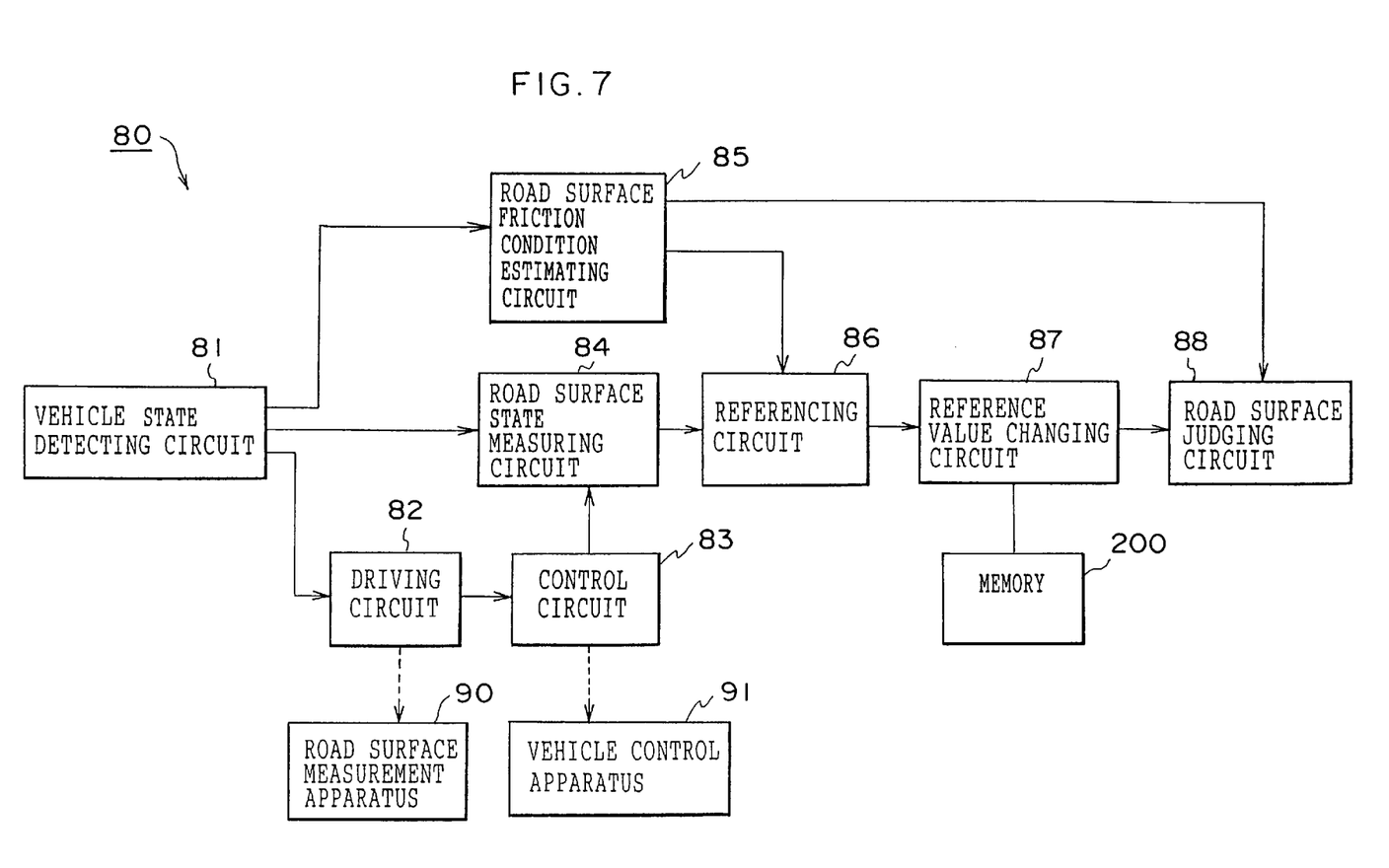
FIG. 7 is a block diagram showing a structure of a road surface judgment device according to a second embodiment of the present invention.

FIG. 7 is a block diagram showing a structure of a road surface judgment device 80 according to a second embodiment of the present invention. The road surface judgment device 80 is disposed on a vehicle and judges the road surface during running of the vehicle.

The road surface judgment device 80 includes a vehicle state detecting circuit 81 for detecting a running state of a vehicle, a driving circuit 82 for driving a road surface measuring device 90 and a control circuit 83 for controlling a vehicle controlling device 91. Incidentally, the vehicle controlling device 91 controls running of the vehicle, and the road surface measuring device 90 measures the road surface during running of the vehicle.

The vehicle state detecting circuit 81 detects states of the vehicle on the basis of the vehicle speed, such as whether the vehicle has started running, whether it is running straight, whether it is running at a constant speed, and whether the tires have been changed.

The driving circuit 82 measures the timing at which the road surface is measured. When this timing is reached, the driving circuit 82 supplies a driving instruction signal, which instructs driving of the vehicle controlling device 91, to the control circuit 83. The driving circuit 82 need not output the driving instruction signal when it judges that the road surface state is bad on the basis of fluctuations in the wheel speed and in acceleration detected by the vehicle state detecting circuit 81 (when the road surface is greatly different between right and left wheels or when it is judged from a steering angle signal that quick steering is being made). In this way, road surface measurement can be conducted only when the vehicle is running stably.

Receiving this signal, the control circuit 83 controls the vehicle controlling device 91 so as to execute braking control or throttle control of acceleration. At this time, the control circuit 83 controls the vehicle controlling device 91 with a short control time and a small control quantity so that no changes arise in the vehicle state. The control circuit 83 may also curb changes in the behavior of the vehicle by executing driving or steering to eliminate influences on the behavior of the vehicle by the control at the same time that braking or the like is applied to one or more of the wheels. The control circuit 83 may further execute driving control such as braking synchronous with the driving of a wiper, an air conditioner, audio equipment, etc. so as to offset the noise that occurs at the time of driving control. The control circuit 83 may further execute driving control such as braking to limit vibration at the time of driving control when the vehicle drives across protrusions on the road surface. Accordingly, the amount of fluctuation in the vehicle at the time the road surface is judged can be reduced, and riding comfort can be prevented from becoming poor.

In addition to supplying the driving instruction signal to the control circuit 83, the driving circuit 82 drives the road surface measuring device 90 to start the road surface measurement. In response, the road surface measuring device 90 measures the road surface while predetermined control is applied to the vehicle.

The road surface judgment device 80 includes a road surface state measuring circuit 84 for acquiring a measurement result of the road surface state, a road surface friction state estimating circuit 85 for calculating an estimation value of the road surface friction state, a referencing circuit 86 for determining the reference value, a reference value changing circuit 87 for changing the reference value whenever necessary, and a road surface judging circuit 88 for judging the road surface state on the basis of the reference value and the estimation value.

Recognizing that the control circuit 83 is executing control for judging the road surface state, the road surface state measuring circuit 84 measures the road surface state on the basis of the vehicle state detected at this time by the vehicle state detecting circuit 81. The road surface state measuring circuit 84 calculates the road surface $\mu$ on the basis of the following formula, for example:

$$\mu = \{I \cdot (dw/dt) + K \cdot Pb\}/m$$

Pb: brake pressure
dw/dt: wheel acceleration
m: wheel load
I: moment of inertia of wheel
K: brake torque coefficient The road surface friction state estimating circuit 85 estimates an index representing the state of friction between the tire and the road surface on the basis of the road surface state detected by the vehicle state detecting circuit 81 and supplies the estimation value to the referencing circuit 86 and the road surface judging circuit 88. The road surface state estimating circuit 85 estimates the $\mu$ gradient as the index representing the friction state (the amount of change in $\mu$ with respect to changes in speed) in a state in which the vehicle is running steadily.

The referencing circuit 86 corresponds the road surface state from the road surface state measuring circuit 84 with the estimation value from the road surface friction state estimating circuit 85 and supplies this relation as the reference value to the reference value changing circuit 87. The referencing circuit 86 corresponds the road surface $\mu$ thus measured with the $\mu$ gradient that is the estimation value, and outputs ($\mu$, $\mu$ gradient) as the reference value.

The reference value changing circuit 87 includes a memory 200, for storing the reference value obtained in the referencing circuit 86. The reference value changing circuit 87 compares the reference value obtained by the referencing circuit 86 with the previous reference value stored in the memory 200, corrects the previous reference value if any difference exists, and supplies the correction result to the road surface judging circuit 88. For example, assuming that a previous reference value ($\mu$, $\mu$ gradient) exists and a new reference value ($\mu$, $\mu$ gradient) is further acquired, when $\mu$ of the previous reference value and $\mu$ of the new reference value is the same but the $\mu$ gradient of the previous reference value and $\mu$ gradient of the new reference value are different, the $\mu$ gradient is replaced. In other words, the reference value changing circuit 87 changes the reference value to ($\mu$, $\mu$ gradient) after replacing only the $\mu$ gradient, as the new reference value, stores this reference value in the memory 200 and supplies it to the road surface judging circuit 88.

The road surface judging circuit 88 judges the road surface state when the vehicle runs on a road surface different from the road surface from which the reference value is determined. More concretely, the road surface judging circuit 88 corresponds the estimation value of the $\mu$ gradient obtained by the road surface friction state estimating circuit 85 with the reference value ($\mu$, $\mu$ gradient) from the reference value changing circuit 87 and judges the road surface $\mu$ on which the vehicle is currently running.

As described above, the road surface judgment device 80 changes the reference value while taking into consideration changes in the characteristics of the vehicle, such as whether the tires have been changed, deterioration in the tires through time, and pay load, and can therefore estimate accurately the road surface state between the tires and the road surface. Since the road surface judgment device 80 minimizes vehicle control when measuring the road surface state, it can reduce changes in the behavior of the vehicle and can prevent ease from becoming poor. When the vehicle is running on a road surface that can be regarded as the same as the reference road surface, the road surface judgment device 80 can accurately estimate changes in vehicle characteristics by comparing the change in the estimation value.

[Third Embodiment]

Figure 8:
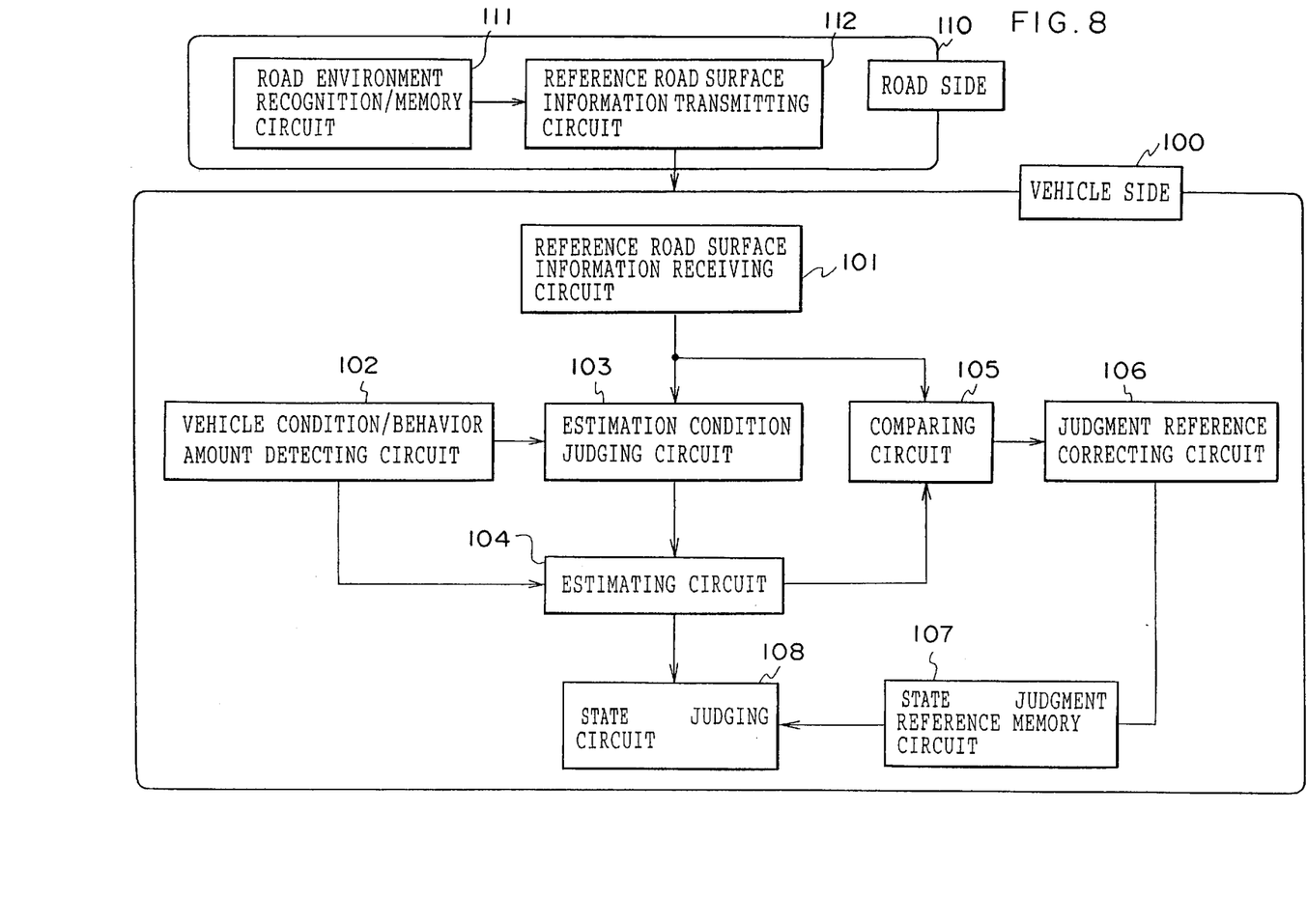
FIG. 8 is a block diagram showing a structure of a road surface judgment circuit according to a third embodiment of the present invention.

FIG. 8 is a block diagram showing a structure of a road surface judging device 100 according to the third embodiment of the present invention. The road surface judgment device 100 receives information from a road environment transmission device 110 provided at a road within a reference zone, determines a reference value as an index representing a road surface state, corrects the reference value whenever necessary, and correctly judges the road surface state by using the reference value when the vehicle runs in other zones.

More concretely, the road surface judgment device 100 includes a reference road surface information receiving circuit 101 for receiving the information from the road environment transmission device 110, a vehicle state/behavior amount detecting circuit 102 for detecting the state of the vehicle during running and its behavior, an estimation condition judging circuit 103 for judging whether or not the condition is optimal for referencing the estimation value, and an estimating circuit 104 for calculating an estimation value.

The road surface judgment device 100 further includes a comparing circuit 105 for comparing a previous estimation value with a new estimation value, a judgment reference correcting circuit 106 for correcting the reference value in accordance with the result of the comparing circuit 105, a state judgment reference memory circuit 107 for storing the reference value after correction, and a state judging circuit 108 for judging the road surface state from the reference value and the estimation value.

The road environment transmission device 110 transmits the road environment information to the running vehicle, and includes a road environment recognition/memory circuit 111 for storing recognized road environment information and a reference road surface information transmitting circuit 112 for transmitting the information stored in this road environment recognition/memory circuit 111.

The road environment recognition/memory circuit 111 measures and stores the road environment information associated with the road surface state such as the start position of the reference zone of the road, the distance of the reference zone, the road surface friction coefficient $\mu$, a road tilt angle, rain quantity, and so forth, and stores the result. The reference road surface information transmitting circuit 112 transmits the environment information stored in the road environment recognition/memory circuit 111 to each running vehicle.

The reference road surface information receiving circuit 101 receives the road environment information from the road environment transmission device 110 and supplies this road environment information to the estimation condition judging circuit 103 and the comparing circuit 105. Incidentally, when the vehicle is not running on the reference road surface, the reference road surface information receiving circuit 101 cannot receive the road environment information. The vehicle state/behavior amount detecting circuit 102 detects the vehicle state/behavior information associated with the vehicle state and its behavior such as wheel speed, steering angle, vehicle body acceleration, etc., and supplies this information to the estimation condition judging circuit 103 and the estimation circuit 104.

The estimation condition judging circuit 103 estimates the road surface state on the basis of the road environment information supplied from the reference road surface information receiving circuit 101 and the vehicle state/behavior information supplied from the vehicle state/behavior amount detecting circuit 102, and judges whether or not the road surface state is suitable for referencing. When the straight running state of the vehicle is the reference, for example, the estimation condition judging circuit 103 does not execute referencing when it detects that the vehicle state/behavior amount detecting circuit 102 is under steering. The estimation condition judging circuit 103 does not execute referencing either, when the reference road surface information receiving circuit 101 receives a report that the weather is not good, a fallen object exists on the road and referencing has just been conducted on a similar road surface. When executing referencing, the estimation condition judging circuit 103 gives this instruction to the estimation circuit 104, and stops referencing when referencing need not be made. The estimation condition judging circuit 103 gives the instruction for judging road surfaces other than the reference road surface to the judging circuit 108 without executing referencing.

Receiving the instruction to execute referencing from the estimation condition judging circuit 103, the estimating circuit 104 estimates the index representing the road surface friction state on the basis of the vehicle state/behavior amount from the vehicle state/behavior amount detecting circuit 102. The estimating circuit 104 estimates the $\mu$ gradient under the steady running state (the amount of change in $\mu$ with respect to the change in speed) from the change in the wheel speed, for example.

The comparing circuit 105 compares the indices representing the road surface states when the vehicle is running on a road within the reference zone. More concretely, the comparing circuit 105 acquires the index representing the road surface state from the environment information from the reference road surface information receiving circuit 101, compares this index with the estimation value obtained by the estimating circuit 104, and supplies the comparison result to the judgment reference correcting circuit 106. The comparing circuit 105 outputs the difference between the "previous $\mu$ gradient" for the reference road surface $\mu$ and the "$\mu$ gradient estimated this time" for the reference road surface $\mu$, for example.

The judgment reference correcting circuit 106 instructs the state judgment reference memory circuit 107 to correct the index of the road surface state with respect to the reference road surface state from the comparison result acquired from the comparing circuit 105. For example, the judgment reference correcting circuit 106 instructs this circuit 107 to correct the $\mu$ gradient corresponding to the reference road surface $\mu$ to the value estimated this time, whenever necessary.

The state judgment reference memory circuit 107 stores ($\mu$, $\mu$ gradient), for example, as the reference value for executing state judgment. Incidentally, the value $\mu$ is obtained from the road environment information that the reference road surface information receiving circuit 101 receives, and the $\mu$ gradient is the value estimated by the estimating circuit 104. When the correction instruction is given from the judgment reference correcting circuit 106, the state judgment reference memory circuit 107 corrects the estimation value in accordance with the instruction, and stores the estimation value so corrected as the reference value. When the correction instruction of the $\mu$ gradient is given, for example, the state judgment reference memory circuit 107 changes the $\mu$ gradient of the reference value ($\mu$, $\mu$ gradient) to the $\mu$ gradient newly estimated by the estimating circuit 104.

The state judging circuit 108 executes road surface judgment when the vehicle is running on a road other than a road surface inside the reference zone. The state judging circuit 108 judges the road surface state on the basis of the estimation value obtained by the estimating circuit 104 and the reference value stored in the state judgment reference memory circuit 107. For example, the state judging circuit 108 estimates the road surface $\mu$ from the estimation value of the $\mu$ gradient of the road other than the road surface in the reference zone by using ($\mu$, $\mu$ gradient) of the reference road surface zone, that is, the relation between $\mu$ and the $\mu$ gradient.

As described above, the road surface judgment device 100 changes the reference value by taking not only the state and behavior of the vehicle itself but also the road state from the road environment transmission device 110 into consideration. Therefore, the road surface judgment device 100 can correctly judge the road surface state in such a manner as to cope with road states that continually change.

When the road environment transmission device 110 is installed in only the reference zone in which the road environment is managed, the road surface judgment device 100 can judge the road surface state in other zones by using the reference value obtained in the reference zone. Therefore, since the road surface can be judged without installing the road environment transmission device 110 in all the zones, the road surface state can be accurately estimated while the installation cost on the road is reduced.

In this embodiment, the $\mu$ gradient is updated when any difference exists between the previous $\mu$ gradient and the new $\mu$ gradient. However, the $\mu$ gradient may be updated whenever the reference road surface information receiving circuit 101 newly receives road environment information.

The tire parameter estimation device according to the present invention estimates the tire parameter relating to the tire and the road surface on the basis of the road surface friction parameters stored in the memory section and the road surface friction parameter newly generated by the road surface friction parameter generation section. Therefore, the tire parameter estimation device can estimate the tire parameter by with a simple structure without increasing the cost of the device.

The road surface judgment device according to the present invention changes the road surface friction state of the reference value to the road surface friction state estimated by the road surface friction state estimating section when the road surface state newly measured by the road surface state measuring section is the same as the road surface state of the reference value, and judges the road surface state of the road on which the vehicle is now running on the basis of the road surface friction state newly estimated by the road surface state estimating section and the reference value thus changed. Accordingly, the road surface judgment device can always judge correctly the road surface state by changing the reference value while taking changes in characteristics of the vehicle consideration.

The road surface judgment device according to the present invention stores the road surface state estimated by the road surface state estimating section as the reference value with respect to the reference road surface into the memory section each time the reception section receives the road surface environment information, and judges the road surface state of road other than the reference road surface on the basis of the road surface state newly estimated by the road surface state estimating section and the reference value with respect to the reference road surface stored in the memory section. Therefore, the road surface judgment device can accurately judge the road surface state by using not only the vehicle state but also the road environment information outside the vehicle.

What is claimed is:

1. A road surface judgment device, comprising:
   a vehicle state detecting section for detecting a running state of a vehicle;
   a road surface friction state estimating section for estimating a road surface friction state of a road surface on which the vehicle is running, on the basis of the running state of the vehicle detected by the vehicle state detecting section;
   a road surface state measuring section for measuring a road surface state of the road surface on which the vehicle is running, on the basis of the running state of the vehicle detected by the vehicle state detecting section and a controlled state of the vehicle;
   a referencing section for comparing the road surface friction state with the road surface state to obtain a road surface friction state reference value and a road surface state reference value;
   a reference value changing section for changing the road surface friction state reference value to the road surface friction state newly estimated by the road surface friction state estimating section when the road surface state newly measured by the road surface state measuring section is the same as the road surface state reference value; and
   a road surface state judging section for judging the road surface state of the road surface on which the vehicle is currently running, on the basis of the road surface friction state newly estimated by the road surface friction state estimating section and the reference values processed by the reference value changing section.

2. A road surface judgment device according to claim 1, wherein the referencing section compares the road surface friction state, at a time at which the vehicle is in a predetermined running state, with the road surface state.

3. A road surface judgment device according to claim 1, wherein the referencing section compares the road surface friction state, at a time at which the vehicle is running on a predetermined road surface, with the road surface state.

4. A road surface judgment device according to claim 2, wherein the referencing section compares the road surface friction state, at a time at which the vehicle is running on a predetermined road surface, with the road surface state.

5. A road surface judgment device according to claim 1, further comprising a memory section for storing the reference values.

6. A road surface judgment device, the device comprising:
- a vehicle state detecting section for detecting a vehicle running state;
- a receiving section for receiving road surface environment information relating to a reference road surface;
- a road surface state estimating section for estimating a road surface state of a road surface on which the vehicle is running, on the basis of the vehicle running state detected by the vehicle state detecting section;
- a memory section for storing, as a reference value with respect to the reference road surface, the road surface state estimated by the road surface state estimating section each time the receiving section receives the road surface environment information; and
- a judgment section for judging a state of a road surface other than the reference road surface, on the basis of the road surface state estimated by the road surface state estimating section and the reference value with respect to the reference road surface stored in the memory section, when the receiving section does not receive the road surface environment information.

7. A road surface judgment device according to claim 6, wherein the memory section stores the road surface state estimated by the road surface state estimating section at a time at which the vehicle is in a predetermined running state, as the reference value with respect to the reference road surface.

8. A road surface judgment device, comprising:
- a vehicle state detecting section for detecting a running state of a vehicle;
- a road surface friction state estimating section for estimating a road surface friction state of a road surface on which the vehicle is running, on the basis of the running state of the vehicle detected by the vehicle state detecting section;
- a road surface state measuring section for measuring a road surface state of the road surface on which the vehicle is running, on the basis of the running state of the vehicle detected by the vehicle state detecting section;
- a referencing section for comparing the road surface friction state with the road surface state to obtain a road surface friction state reference value and a road surface state reference value;
- a reference value changing section for changing the road surface friction state reference value to the road surface friction state newly estimated by the road surface friction state estimating section when the road surface state newly measured by the road surface state measuring section is the same as the road surface state reference value; and
- a road surface state judging section for judging the road surface state of the road surface on which the vehicle is currently running, on the basis of the road surface friction state newly estimated by the road surface friction state estimating section and the reference values processed by the reference value changing section.

* * * * *